G. L. MERRILL,

Assignor to himself and O. F. SOULE.

Metallic-Can.

No. 8,700. Reissued May 6, 1879.

Attest:

R. M. Lundy Jr

John Dolley Jr

Inventor:

G. Lewis Merrill

By his Attorneys

Wm C. Strawbridge

J. Bonsall Taylor.

UNITED STATES PATENT OFFICE.

G. LEWIS MERRILL, OF SYRACUSE, NEW YORK, ASSIGNOR TO HIMSELF AND OSCAR F. SOULE.

IMPROVEMENT IN METALLIC CANS.

Specification forming part of Letters Patent No. 211,578, dated January 21, 1879; Reissue No. 8,700, dated May 6, 1879; application filed February 20, 1879.

*To all whom it may concern:*

Be it known that I, G. LEWIS MERRILL, of Syracuse, Onondaga county, New York, have invented certain new and useful Improvements in the Mode of Making Metallic Cans, of which I do hereby declare the following to be a full, clear, and precise description, and sufficient to enable those skilled in the art to which my invention appertains to comprehend it, reference being had to the accompanying drawings, forming part of this specification, of which—

Figure 1:
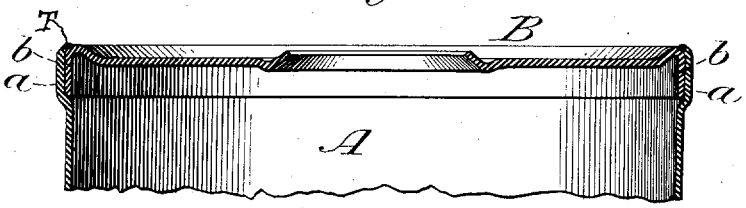
Figure 2:
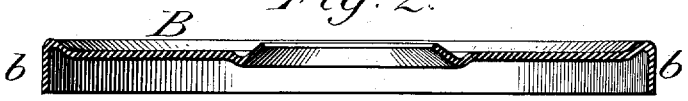
Figure 3:
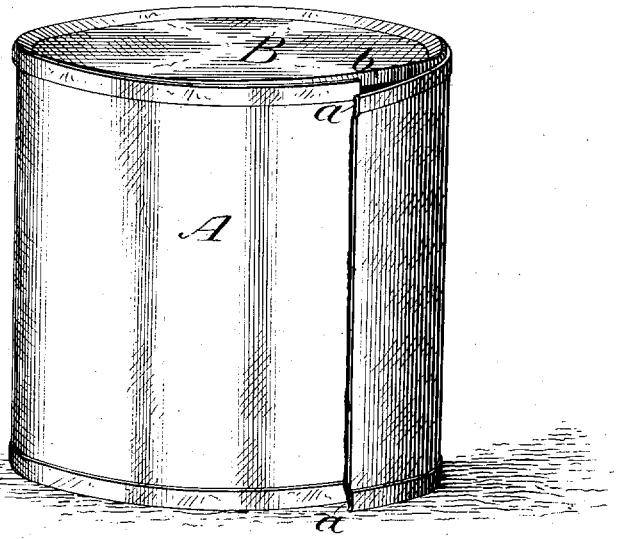
Figure 4:
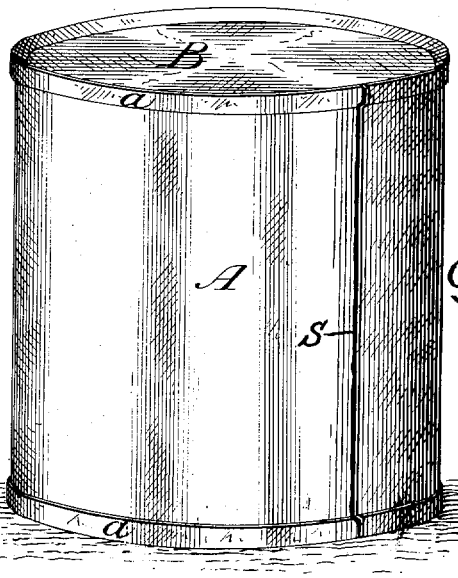

Figure 1 is a central sectional elevation of a can constructed according to my invention; Fig. 2, a transverse section of one of the heads; Fig. 3, a view of the can-body with its seam open and with the heads unsecured; and Fig. 4 a similar view, the side seam being soldered and the heads secured.

Similar letters of reference indicate corresponding parts.

My invention relates to the class of hermetically-sealed metallic cans employed to contain fruits, preserves, paints, and the like, and in which the head is countersunk within the side body.

It consists in the method of making a can, as above described, by leaving the side seam of the body entirely unsoldered until both heads are in position, and then compressing or clamping the body about the heads and soldering the side seam, so as to retain them finally in place.

Referring to the drawings, A is the body of the can; B are the heads thereof. *a a* are the corrugations, beads, or recesses in the chines of the body; *b*, the rims or faces on the heads, which take into and are embraced by the corrugations or recesses *a a*.

It is obvious that although the form of the respective corrugations or recesses may be varied, their correspondence or relation must be such as to enable the chine corrugations or recesses to retain the rims or edges of the heads in such manner that the latter can be displaced in neither direction.

In the making of the can, after the body has been clamped about the heads, it may be retained on them by a drop of solder upon the seam, and may be afterward completely soldered at leisure. The solder of the side seam is shown at S in Fig. 4.

When desirable, the edges of the heads of the finished can may be soldered on the line of the extreme edge of the body, as indicated at T in the drawings.

Having thus described my invention, I claim and desire to secure by Letters Patent of the United States—

The method of making a can herein described, which consists in placing the heads in position inside the body before soldering the side seam, clamping the body upon the heads, and then soldering the side seam to retain the heads in place, substantially as shown and described.

In testimony whereof I have hereunto signed my name this 17th day of February, 1879.

G. LEWIS MERRILL. [L. S.]

In presence of—

E. M. CROSS,

W. P. WATKINS.